(12) United States Patent
Sano

(10) Patent No.: US 8,642,213 B2
(45) Date of Patent: Feb. 4, 2014

(54) LITHIUM-ION SECONDARY BATTERY

(75) Inventor: Atsushi Sano, Tokyo (JP)

(73) Assignee: TDK Corporation, Tokyo (JP)

( * ) Notice: Subject to any disclaimer, the term of this patent is extended or adjusted under 35 U.S.C. 154(b) by 515 days.

(21) Appl. No.: 12/861,353

(22) Filed: Aug. 23, 2010

(65) Prior Publication Data

US 2011/0052996 A1 Mar. 3, 2011

(30) Foreign Application Priority Data

Aug. 28, 2009 (JP) ................ P2009-198661

(51) Int. Cl.
*H01M 4/583* (2010.01)
*H01M 4/13* (2010.01)

(52) U.S. Cl.
USPC .......... 429/231.5; 429/231.95; 429/209; 429/212

(58) Field of Classification Search
USPC .............. 429/209, 212, 218.1, 231.95
See application file for complete search history.

(56) References Cited

U.S. PATENT DOCUMENTS

| | | | |
|---|---|---|---|
| 7,592,095 B2* | 9/2009 | Lee et al. .................. 429/118 |
| 7,645,544 B2* | 1/2010 | Ihara et al. ................ 429/340 |
| 7,682,746 B2* | 3/2010 | Koshina .................. 429/231.1 |
| 7,695,863 B2 | 4/2010 | Abe et al. |
| 7,838,153 B2* | 11/2010 | Sumihara et al. .......... 429/233 |
| 7,947,396 B2* | 5/2011 | Ugaji et al. ............. 429/231.95 |
| 8,247,096 B2* | 8/2012 | Ugaji et al. ............... 429/47 |
| 2004/0139587 A1* | 7/2004 | Sato et al. ................ 29/25.03 |
| 2004/0146786 A1* | 7/2004 | Sato et al. ................. 429/326 |
| 2004/0197667 A1* | 10/2004 | Noh et al. ................ 429/326 |
| 2007/0148554 A1* | 6/2007 | Abe ........................... 429/330 |
| 2008/0038644 A1* | 2/2008 | Abe et al. ................... 429/331 |
| 2009/0090154 A1* | 4/2009 | Sandner ....................... 72/250 |
| 2009/0239154 A1* | 9/2009 | Lee et al. .................... 429/347 |
| 2009/0253045 A1 | 10/2009 | Kotato et al. |
| 2009/0317721 A1* | 12/2009 | Shirane et al. ........ 429/231.95 |
| 2010/0003599 A1* | 1/2010 | Nonoshita et al. ........ 429/209 |
| 2010/0035161 A1* | 2/2010 | Yamaguchi et al. ....... 429/330 |
| 2010/0075233 A1* | 3/2010 | Yamaguchi et al. ....... 429/338 |

(Continued)

FOREIGN PATENT DOCUMENTS

| | | |
|---|---|---|
| CN | 101091283 | 12/2007 |
| CN | 101356666 A | 1/2008 |

(Continued)

*Primary Examiner* — Joseph S. Del Sole
*Assistant Examiner* — Nahida Sultana
(74) *Attorney, Agent, or Firm* — Oliff & Berridge, PLC

(57) ABSTRACT

A lithium-ion secondary battery comprises a negative electrode active material, a positive electrode active material, and an electrolytic solution. The negative electrode active material contains elemental silicon or a silicon-containing alloy. The electrolytic solution has a lithium salt and a solvent. The solvent contains a cyclic carbonate, a chain carbonate, fluoroethylene carbonate represented by the formula (1), and 1,3-propane sultone. In the electrolytic solution, fluoroethylene carbonate has a mass concentration Cf of 0.1 to 3 mass %, 1,3-propane sultone has a mass concentration Cp of 0.1 to 3 mass %, and Cf>Cp.

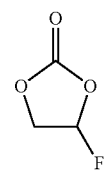

(1)

1 Claim, 2 Drawing Sheets

(56) References Cited

U.S. PATENT DOCUMENTS

| | | | |
|---|---|---|---|
| 2010/0178557 A1* | 7/2010 | Lee et al. | 429/199 |
| 2010/0291441 A1 | 11/2010 | Ugaji et al. | |
| 2011/0091768 A1* | 4/2011 | Ohashi et al. | 429/199 |
| 2011/0223476 A1* | 9/2011 | Kobayashi et al. | 429/199 |
| 2011/0229770 A1* | 9/2011 | Yun et al. | 429/326 |
| 2011/0244339 A1* | 10/2011 | Jeon et al. | 429/324 |
| 2011/0311866 A1* | 12/2011 | Lim et al. | 429/207 |

FOREIGN PATENT DOCUMENTS

| | | | | |
|---|---|---|---|---|
| JP | A 11-307120 | 11/1999 | | |
| JP | A 2005-063772 | 3/2005 | | |
| JP | A 2006-294519 | 10/2006 | | |
| JP | A 2008-10414 | 1/2008 | | |
| JP | 2009110798 | * 5/2009 | | H01M 10/36 |
| JP | A 2009-110798 | 5/2009 | | |
| WO | WO2008072430 | * 6/2008 | | H01M 10/0525 |

* cited by examiner

LITHIUM-ION SECONDARY BATTERY

BACKGROUND OF THE INVENTION

1. Field of the Invention

The present invention relates to a lithium-ion secondary battery.

2. Related Background Art

Known as a lithium-ion secondary battery is one using a negative electrode active material containing elemental silicon or a silicon-containing alloy or a silicon-containing oxide, which has been supposed to yield a theoretical capacity higher than that of a graphite negative electrode (see, for example, Japanese Patent Application Laid-Open Nos. 2009-110798, 2005-63772, 2006-294519, 11-307120, and 2008-10414).

SUMMARY OF THE INVENTION

However, the above-mentioned lithium-ion secondary battery has not attained a sufficient cycle characteristic yet.

It is therefore an object of the present invention to provide a lithium-ion secondary battery which uses a negative electrode active material containing elemental silicon or a silicon-containing alloy or a silicon-containing oxide and yields a sufficiently high cycle characteristic.

The lithium-ion secondary battery in accordance with the present invention comprises a negative electrode active material, a positive electrode active material, and an electrolytic solution. The negative electrode active material contains elemental silicon or a silicon-containing alloy or a silicon-containing oxide. The electrolytic solution has a lithium salt and a solvent. The solvent contains a cyclic carbonate, a chain carbonate, fluoroethylene carbonate represented by the formula (1), and 1,3-propane sultone. In the electrolytic solution, fluoroethylene carbonate has a mass concentration Cf of 0.1 to 3 mass %, 1,3-propane sultone has a mass concentration Cp of 0.1 to 3 mass %, and Cf>Cp.

[Chem. 1]

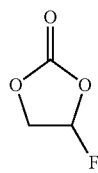

(1)

The present invention provides a lithium-ion secondary battery which uses a negative electrode active material containing elemental silicon or a silicon-containing alloy or a silicon-containing oxide and yields a sufficiently high cycle characteristic.

DESCRIPTION OF THE PREFERRED EMBODIMENTS

Figure 1:
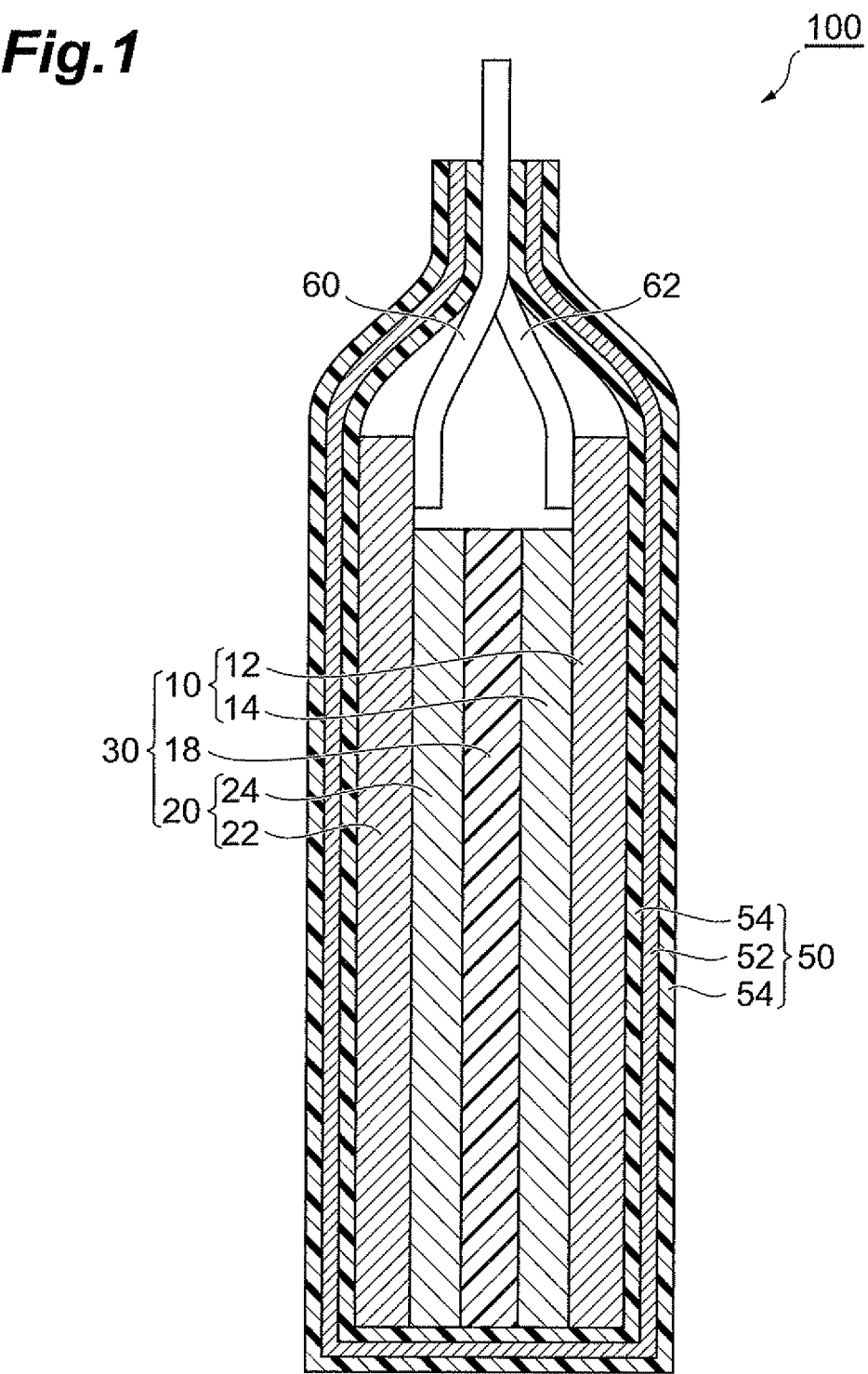
FIG. 1 is a schematic sectional view of the lithium-ion secondary battery in accordance with an embodiment of the present invention.

In the following, preferred embodiments of the present invention will be explained in detail with reference to the accompanying drawings. Ratios of dimensions in the drawings do not always match those in practice.

Electrolytic Solution

The electrolytic solution in accordance with an embodiment has a lithium salt and a solvent.

The solvent contains a cyclic carbonate, a chain carbonate, fluoroethylene carbonate represented by the formula (1), and 1,3-propane sultone.

[Chem. 2]

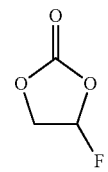

(1)

Examples of the cyclic carbonate include ethylene carbonate (EC), propylene carbonate (PC), butylene carbonate (BC), and their mixtures. In particular, ethylene carbonate is preferably contained.

Examples of the chain carbonate include dimethyl carbonate (DMC), diethyl carbonate (DEC), ethyl methyl carbonate (EMC), and their mixtures. In particular, diethyl carbonate is preferably contained.

Here, a mixture of the cyclic and chain carbonates is a main ingredient of the solvent. Though the ratio between the cyclic and chain carbonates in the main ingredient of the solvent is not limited in particular, the volume ratio between the cyclic carbonate and chain carbonate is preferably 10 to 50:90 to 50, more preferably 20 to 40:80 to 60.

As additives, fluoroethylene carbonate represented by the formula (1) and 1,3-propane sultone are added to the main ingredient of the solvent.

Fluoroethylene carbonate represented by the formula (1) is a compound also known as 4-fluoro-1,3-dioxolan-2-one.

In the electrolytic solution, fluoroethylene carbonate has a mass concentration Cf of 0.1 to 3 mass %, 1,3-propane sultone has a mass concentration Cp of 0.1 to 3 mass %, and Cf>Cp. Preferably, Cp is 1 to 3 mass %.

Examples of the lithium salt include salts such as $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and LiBOB (lithium bis(oxalato)borate), though not limited in particular. These salts may be used either singly or in combinations of two or more. The concentration of the lithium salt in the electrolytic solution may be 1.1 to 2.0 M, for example, though not limited in particular.

Lithium-Ion Secondary Battery

The lithium-ion secondary battery in accordance with the present invention will now be explained in brief with reference to FIG. 1.

This lithium-ion secondary battery 100 mainly comprises a multilayer body 30, a case 50 accommodating the multilayer body 30 in a closed state, and a pair of leads 60, 62 connected to the multilayer body 30.

The multilayer body 30 is one in which a pair of positive and negative electrodes 10, 20 are arranged such as to oppose each other with a separator 18 interposed therebetween. The positive electrode 10 comprises a positive electrode current collector 12 and a positive electrode active material layer 14 disposed thereon. The negative electrode 20 comprises a negative electrode current collector 22 and a negative electrode active material layer 24 disposed thereon. The positive electrode active material layer 14 and negative electrode active material layer 24 are in contact with the separator 18 on both sides, respectively. Leads 60, 62 are connected to respective end parts of the negative and positive electrode current collectors 22, 12, while end parts of the leads 60, 62 extend to the outside of the case 50.

Positive Electrode

As illustrated in FIG. 1, the positive electrode 10 has the planar (film-shaped) positive electrode current collector 12 and the positive electrode active material layer 14 formed on the positive electrode current collector 12.

The positive electrode current collector 12 may be any conductive planar material, examples of which include thin metal plates made of aluminum, copper, and nickel foils. The positive electrode active material layer 14 mainly comprises an positive electrode active material and a binder. The active material layer 14 may also contain a conductive auxiliary.

The positive electrode active material 2 is not limited in particular as long as it allows occlusion and release of lithium ions, desorption and insertion (intercalation) of lithium ions, or doping and undoping of lithium ions and their counteranions (e.g., $PF_6^-$) to proceed reversibly; known positive electrode active materials can be used. Examples of the positive electrode active material include lithium cobaltate ($LiCoO_2$), lithium nickelate ($LiNiO_2$), lithium manganese spinel ($LiMn_2O_4$), mixed metal oxides expressed by the general formula of $LiNi_xCo_yMn_zM_aO_2$ (where x+y+z+a=1, $0 \leq x \leq 1$, $0 \leq y \leq 1$, $0 \leq z \leq 1$, $0 \leq a \leq 1$, and M is at least one kind of element selected from Al, Mg, Nb, Ti, Cu, Zn, and Cr), a lithium vanadium compound ($LiV_2O_5$), olivine-type $LiMPO_4$ (where M is at least one kind of element selected from Co, Ni, Mn or Fe, Mg, Nb, Ti, Al, and Zr, or VO), and mixed metal oxides such as lithium titanate ($Li_4Ti_5O_{12}$).

The binder binds particles of the active material to each other and the active material and the positive electrode current collector 12 to each other. Any material may be used as the binder as long as it can achieve the binding mentioned above. Examples of the binder include fluororesins such as polyvinylidene fluoride (PVDF), polytetrafluoroethylene (PTFE), tetrafluoroethylene/hexafluoropropylene copolymers (FEP), tetrafluoroethylene/perfluoroalkylvinyl ether copolymers (PFA), ethylene/tetrafluoroethylene copolymers (ETFE), polychlorotrifluoroethylene (PCTFE), ethylene/chlorotrifluoroethylene copolymers (ECTFE), and polyvinyl fluoride (PVF).

Other examples of the binder include fluororubbers based on vinylidene fluoride such as vinylidene fluoride/hexafluoropropylene-based fluororubbers (VDF/HFP-based fluororubbers), vinylidene fluoride/hexafluoropropylene/tetrafluoroethylene-based fluororubbers (VDF/HFP/TFE-based fluororubbers), vinylidene fluoride/pentafluoropropylene-based fluororubbers (VDF/PFP-based fluororubbers), vinylidene fluoride/pentafluoropropylene/tetrafluoroethylene-based fluororubbers (VDF/PFP/TFE-based fluororubbers), vinylidene fluoride/perfluoromethylvinylether/tetrafluoroethylene-based fluororubbers (VDF/PFMVE/TFE-based fluororubbers), and vinylidene fluoride/chlorotrifluoroethylene-based fluororubbers (VDF/CTFE-based fluororubbers).

Still other examples of the binder include polyethylene, polypropylene, polyethylene terephthalate, aromatic polyamides, cellulose, styrene/butadiene rubber, isoprene rubber, butadiene rubber, and ethylene/propylene rubber. Also usable are thermoplastic elastomeric polymers such as styrene/butadiene/styrene block copolymers and their hydrogenated derivatives, styrene/ethylene/butadiene/styrene copolymers, and styrene/isoprene/styrene block copolymers and their hydrogenated derivatives. Further, syndiotactic 1,2-polybutadiene, ethylene/vinyl acetate copolymers, propylene-α-olefin copolymers (having a carbon number of 2 to 12), and the like may be used.

Electronically and ionically conductive polymers may also be used as the binder. An example of the electronically conductive polymer is polyacetylene. In this case, the binder also functions as conductive auxiliary particles, thereby making it unnecessary to add conductive auxiliaries thereto.

As the ionically conductive polymer, one which conducts ions such as lithium ions can be used, for example. Its examples include those in which monomers of polymer compounds (polyether-based polymer compounds such as polyethylene oxide and polypropylene oxide, crosslinked polymers of polyether compounds, polyepichlorohydrin, polyphosphazene, polysiloxane, polyvinylpyrrolidone, polyvinylidene carbonate, polyacrylonitrile, and the like) are complexed with lithium salts or alkali metal salts mainly composed of lithium such as $LiClO_4$, $LiBF_4$, $LiPF_6$, $LiAsF_6$, LiCl, LiBr, $Li(CF_3SO_2)_2N$, and $LiN(C_2F_5SO_2)_2$. Examples of polymerization initiators used for complexing include photopolymerization initiators and thermal polymerization initiators suitable for the monomers mentioned above.

Preferably, the binder content in the active material layer 24 is 0.5 to 6 mass % based on the mass of the active material layer. When the binder content is less than 0.5 mass %, the amount of the binder tends to be too small to form a strong active material layer. When the binder content exceeds 6 mass %, by contrast, a greater amount of the binder tends to be kept from contributing to the electric capacity, thereby making it harder to yield a sufficient volume energy density. In particular, when the binder has a low electronic conductivity in this case, the active material layer tends to increase its electric resistance, thereby failing to yield a sufficient electric capacity.

Examples of the conductive auxiliary include carbon blacks, carbon materials, fine powders of metals such as copper, nickel, and iron, mixtures of the carbon materials and fine metal powders, and conductive oxides such as ITO.

Negative Electrode

The negative electrode 20 comprises the planar negative electrode current collector 22 and the negative electrode active material layer 24 formed on the negative electrode current collector 22. The negative electrode current collector 22, binder, and conductive auxiliary may be similar to those in the positive electrode.

As the negative electrode active material, an active material containing elemental silicon or a silicon-containing alloy or a silicon-containing oxide is used. Examples of the silicon-containing alloy include alloys formed with metals other than silicon such as Al and Sn. Examples of the silicon-containing oxide include silicon monoxide, silicon dioxide, and $SiO_x$ (1<x<2). Such an active material is typically in a particle form. The particle size is preferably 5 to 100 nm, though not restricted in particular.

Electrolytic Solution

The above-mentioned electrolytic solution is contained within the positive electrode active material layer 14, negative electrode active material layer 24, and separator 18. In this embodiment, a gelling agent may be added to the above-mentioned electrolytic solution, so as to form a gelled electrolyte.

Separator

The separator 18 is an electrically insulating porous structure, examples of which include monolayer or multilayer bodies of films constituted by any of polyethylene, polypropylene, and polyolefin, extended films of mixtures of these resins, and fibrous nonwovens constituted by at least one kind of constituent material selected from the group consisting of cellulose, polyester, and polypropylene.

Case

The case 50 is one which seals the multilayer body 30 and electrolytic solution therein. The case 50 is not limited in particular as long as it can inhibit the electrolytic solution from leaking out therefrom and moisture and the like from invading the lithium-ion secondary battery 100 from the outside. For example, as illustrated in FIG. 1, a metal-laminated film in which a metal foil 52 is coated with polymer films 54 on both sides can be utilized as the case 50. An aluminum foil can be used as the metal foil 52, for example, while films of polypropylene and the like can be used as the polymer films 54. Preferred examples of the material for the outer polymer film 54 include polymers having a high melting point such as polyethylene terephthalate (PET) and polyamide. Preferred examples of the material for the inner polymer film 54 include polyethylene and polypropylene.

The leads 60, 62 are formed from a conductive material such as aluminum.

Known methods may be used to weld the leads 60, 62 to the negative electrode current collector 22 and positive electrode current collector 12, respectively, insert the positive electrode active material layer 14 of the positive electrode 10 and the negative electrode active material layer 24 of the negative electrode 20 holding the separator 18 therebetween into the case 50 together with the electrolytic solution, and then seal the inlet of the case 50, whereby the lithium-ion secondary battery 100 can be made easily.

The present invention sufficiently improves the cycle characteristic of a lithium-ion secondary battery which uses elemental silicon or a silicon-containing alloy or a silicon-containing oxide as a negative electrode active material. The reason therefore is not clear but can be inferred as follows. The negative electrode active material constituted by elemental silicon or a silicon-containing alloy or a silicon-containing oxide seems to incur large expansion and shrinkage due to lithium ion occlusion and release cycles upon charging and discharging, thereby generating fractures and the like, thus deteriorating the cycle characteristic. By contrast, it is deemed that, since the concentrations of fluoroethylene carbonate and 1,3-propane sultone fall within their appropriate ranges, they form an optimal coating and inhibit the solvent from decomposing when a crack enters the active material and forms a new surface.

Though a preferred embodiment of the electrolytic solution and a lithium-ion secondary battery using the same has been explained in detail in the foregoing, the present invention is not limited to the above-mentioned embodiment.

For example, the lithium-ion secondary battery is not limited in particular in terms of its form and may have various forms as long as the negative and positive electrode active materials oppose each other.

EXAMPLES

Example 1

Ethylene carbonate (EC) and diethyl carbonate (DEC) were mixed at a volume ratio of 3:7, fluoroethylene carbonate of the formula (1) and 1,3-propane sultone were added thereto by 1.70 mass % and 1.20 mass %, respectively, and 1 M of LiPF$_6$ was further added thereto as a lithium salt, so as to yield an electrolytic solution.

Next, a positive electrode constituent material composed of LiNi$_{1/3}$Co$_{1/3}$O$_2$, polyvinylidene fluoride (PVDF), and acetylene black at a weight ratio of 92:5:3 and a negative electrode constituent material composed of an Si powder, a polyimide resin (PI), and acetylene black at a weight ratio of 83:2:15 were each mixed with N-methyl-2-pyrrolidone (NMP), so as to prepare respective slurries for positive and negative electrodes. The positive and negative electrode slurries were applied to aluminum and copper foils which were current collectors, respectively, dried, and then rolled, so as to yield positive and negative electrodes.

Thus obtained positive and negative electrodes were mounted on each other with a separator constituted by a macroporous polyethylene film interposed therebetween, so as to yield a multilayer body. This multilayer body was put into an aluminum-laminated pack, the above-mentioned electrolytic solution was injected therein, and then the aluminum-laminator pack was sealed in a vacuum, so as to make an evaluation cell of Example 1.

Examples 2 to 17 and Comparative Examples 1 to 14

The procedure of Example 1 was carried out except that the concentration Cf of fluoroethylene carbonate (FEC) and the concentration Cp of 1,3-propane sultone were changed as listed in Table 1. In Example 17, propylene carbonate (PC) was further added as a cyclic carbonate.

Evaluation: Cycle Characteristic

Figure 2:
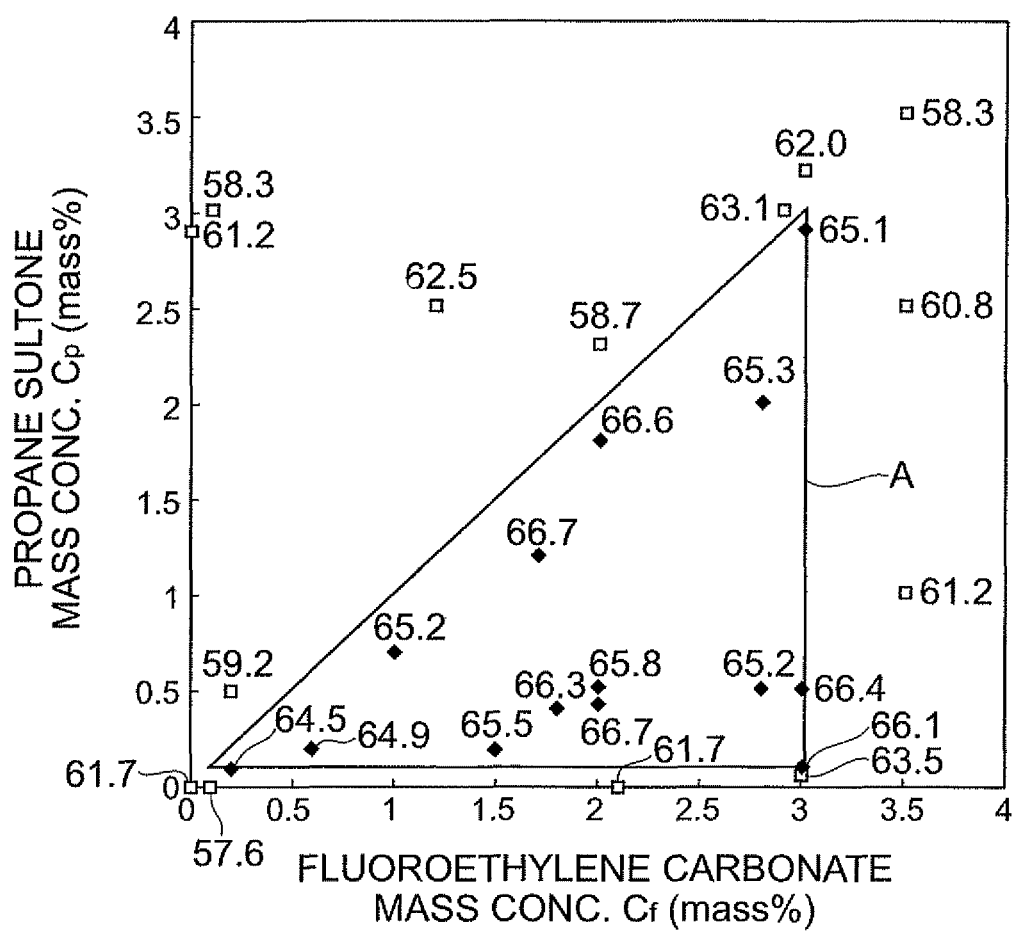
FIG. 2 is a graph plotting respective conditions of examples and comparative examples together with their cycle characteristics on a chart whose abscissa and ordinate indicate the concentration Cf of fluoroethylene carbonate (FEC) and concentration Cp of 1,3-propane sultone, respectively.

Each battery was electrically charged at a rate of 1 C at 25° C. by constant current—constant voltage charging at 4.2 V. Thereafter, constant current discharging to 2.5 V was performed at a rate of 1 C at 25° C. Counting them as 1 cycle of charging and discharging, 200 cycles were carried out. The ratio (%) of the discharge capacity at the 200th cycle to that of the 1st cycle was determined as a cycle characteristic. Table 1 lists the results. FIG. 2 illustrates a graph plotting the cycle characteristics onto a chart of the fluoroethylene carbonate (FEC) concentration Cf and 1,3-propane sultone concentration Cp.

TABLE 1

| | Electrolytic solution composition | | | | Volume retention after 200 cycles (%) |
|---|---|---|---|---|---|
| | Solvent main ingredient | Additive composition | | | |
| | composition (volume ratio) | FEC conc. Cf (mass %) | PS conc. Cp (mass %) | Cf/Cp [—] | |
| Example 1 | EC + DEC (3:7) | 1.70 | 1.20 | 1.42 | 66.7 |
| Example 2 | EC + DEC (3:7) | 2.00 | 0.43 | 4.65 | 66.7 |

TABLE 1-continued

| | Electrolytic solution composition | | | | Volume retention after 200 cycles (%) |
|---|---|---|---|---|---|
| | Solvent main ingredient | Additive composition | | | |
| | composition (volume ratio) | FEC conc. Cf (mass %) | PS conc. Cp (mass %) | Cf/Cp [—] | |
| Example 3 | EC + DEC (3:7) | 2.00 | 1.80 | 1.11 | 66.6 |
| Example 4 | EC + DEC (3:7) | 1.80 | 0.40 | 4.50 | 66.3 |
| Example 5 | EC + DEC (3:7) | 1.50 | 0.20 | 7.50 | 65.5 |
| Example 6 | EC + DEC (3:7) | 1.00 | 0.70 | 1.43 | 65.2 |
| Example 7 | EC + DEC (3:7) | 0.60 | 0.20 | 3.00 | 64.9 |
| Example 8 | EC + DEC (3:7) | 2.80 | 2.00 | 1.40 | 65.3 |
| Example 9 | EC + DEC (3:7) | 2.80 | 0.50 | 5.60 | 65.2 |
| Example 10 | EC + DEC (3:7) | 3.00 | 0.50 | 6.00 | 66.4 |
| Example 11 | EC + DEC (3:7) | 3.00 | 0.10 | 30.00 | 66.1 |
| Example 12 | EC + DEC (3:7) | 3.00 | 2.90 | 1.03 | 65.1 |
| Example 13 | EC + DEC (3:7) | 0.20 | 0.10 | 2.00 | 64.5 |
| Example 14 | EC + DEC (4:6) | 2.00 | 0.50 | 4.00 | 65.8 |
| Example 15 | EC + DEC (2:8) | 2.00 | 0.50 | 4.00 | 65.7 |
| Example 16 | EC + MEC(3:7) | 2.00 | 0.50 | 4.00 | 65.4 |
| Example 17 | PC + EC + DEC (2:1:7) | 2.00 | 0.50 | 4.00 | 66.7 |
| Comparative Example 1 | EC + DEC (3:7) | 2.10 | 0.00 | — | 61.7 |
| Comparative Example 2 | EC + DEC (3:7) | 1.20 | 2.50 | 0.48 | 62.5 |
| Comparative Example 3 | EC + DEC (3:7) | 0.00 | 2.90 | 0.00 | 61.2 |
| Comparative Example 4 | EC + DEC (3:7) | 200 | 2.30 | 0.87 | 58.7 |
| Comparative Example 5 | EC + DEC (3:7) | 0.00 | 0.00 | — | 53.7 |
| Comparative Example 6 | EC + DEC (3:7) | 3.00 | 0.05 | 60.00 | 63.5 |
| Comparative Example 7 | EC + DEC (3:7) | 0.10 | 0.00 | — | 57.6 |
| Comparative Example 8 | EC + DEC (3:7) | 0.10 | 3.00 | 0.03 | 58.3 |
| Comparative Example 9 | EC + DEC (3:7) | 0.20 | 0.50 | 0.40 | 59.2 |
| Comparative Example 10 | EC + DEC (3:7) | 2.90 | 3.00 | 0.97 | 63.1 |
| Comparative Example 11 | EC + DEC (3:7) | 3.00 | 3.20 | 0.94 | 62 |
| Comparative Example 12 | EC + DEC (3:7) | 3.50 | 1.00 | 3.50 | 61.2 |
| Comparative Example 13 | EC + DEC (3:7) | 3.50 | 2.50 | 1.40 | 60.8 |
| Comparative Example 14 | EC + DEC (3:7) | 3.50 | 3.50 | 1.00 | 58.3 |

As illustrated in FIG. 2, high cycle characteristics were seen to be obtained within the range indicated by a triangle A.

REFERENCE SIGNS LIST 10, 20 . . . electrode; 12 . . . positive electrode current collector; 14 . . . positive electrode active material layer; 18 . . . separator; 22 . . . negative electrode current collector; 24 . . . negative electrode active material layer; 30 . . . multilayer body; 50 . . . case; 52 . . . metal foil; 54 . . . polymer film; 60, 62 . . . lead; 100 . . . lithium-ion secondary battery

What is claimed is:

1. A lithium-ion secondary battery comprising a negative electrode active material, a positive electrode active material, and an electrolytic solution;
    wherein the negative electrode active material contains elemental silicon or a silicon-containing alloy or a silicon-containing oxide;
    wherein the electrolytic solution has a lithium salt and a solvent;
    wherein the solvent contains a cyclic carbonate, a chain carbonate, fluoroethylene carbonate represented by the formula (1), and 1,3-propane sultone;
    wherein fluoroethylene carbonate has a mass concentration Cf of 0.1 to 3 mass % in the electrolytic solution;
    wherein 1,3-propane sultone has a mass concentration Cp of 0.1 to 3 mass % in the electrolytic solution; and
    wherein Cf>Cp.

[Chem. 1]

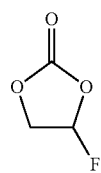

(1)

\* \* \* \* \*